(12) United States Patent
Yamauchi et al.

(10) Patent No.: US 12,534,145 B2
(45) Date of Patent: Jan. 27, 2026

(54) SADDLE-RIDE VEHICLE

(71) Applicant: HONDA MOTOR CO., LTD., Tokyo (JP)

(72) Inventors: Yohei Yamauchi, Tokyo (JP); Hirokazu Kanetani, Tokyo (JP); Kenta Bando, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 421 days.

(21) Appl. No.: 18/189,444

(22) Filed: Mar. 24, 2023

(65) Prior Publication Data
US 2023/0312033 A1  Oct. 5, 2023

(30) Foreign Application Priority Data

Mar. 31, 2022  (JP) .................................. 2022-058238

(51) Int. Cl.
 *B62H 1/02* (2006.01)
 *B62K 11/02* (2006.01)
(52) U.S. Cl.
 CPC ................ *B62H 1/02* (2013.01); *B62K 11/02* (2013.01)
(58) Field of Classification Search
 CPC ... B62H 1/00; B62H 1/02; B62H 1/04; B62H 1/06; B62K 11/00; B62K 11/02; B62K 11/04; B62K 11/06; B62K 11/08; B62K 11/10
 See application file for complete search history.

(56) References Cited

U.S. PATENT DOCUMENTS

| 4,582,336 A * | 4/1986 | Onoda ..................... B62H 1/02 280/293 |
| 4,775,025 A | 10/1988 | Parker et al. |
| 2004/0195745 A1* | 10/2004 | Oliver .................. B60G 17/021 267/221 |
| 2008/0157503 A1* | 7/2008 | Imai ......................... B62H 1/04 280/301 |

(Continued)

FOREIGN PATENT DOCUMENTS

| DE | 3515511 A1 | 11/1986 |
| DE | 102 39 139 A1 | 3/2004 |
| DE | 102 39 140 A1 | 11/2004 |

(Continued)

OTHER PUBLICATIONS

Japanese Office Action dated Jan. 9, 2024 issued in corresponding Japanese application No. 2022-058238; English translation included (11 pages).

(Continued)

*Primary Examiner* — Jacob S. Scott
(74) *Attorney, Agent, or Firm* — Rankin, Hill & Clark LLP

(57) ABSTRACT

A saddle-ride vehicle comprising a swing arm which supports a rear wheel, a cushion which is coupled between a vehicle body frame and the swing arm, and a main stand which supports a vehicle body, and in the saddle-ride vehicle, an eccentric cam mechanism and an actuator which drives the eccentric cam mechanism are disposed in a coupling part between the vehicle body frame and the cushion, and after the main stand is brought into a use state, the eccentric cam mechanism is driven to cause the swing arm to swing upward and to bring the rear wheel into a raised state.

9 Claims, 11 Drawing Sheets

(56) References Cited

U.S. PATENT DOCUMENTS

2015/0137476 A1   5/2015   Nesbitt, III

FOREIGN PATENT DOCUMENTS

| GB | 139299 | 3/1920 |
| JP | S63-159116 A | 7/1988 |
| JP | S63-188581 A | 8/1988 |
| JP | H2-109786 A | 4/1990 |
| JP | H7-266819 A | 10/1995 |
| JP | 2017-159824 A | 9/2017 |

OTHER PUBLICATIONS

German Office Action dated Sep. 11, 2025 issued in corresponding German application No. 10 2023 107 448.2; English translation included (10 pages).

* cited by examiner

SADDLE-RIDE VEHICLE

INCORPORATION BY REFERENCE

The present application claims priority under 35 U.S.C. § 119 to Japanese Patent Application No. 2022-058238 filed on Mar. 31, 2022. The content of the application is incorporated herein by reference in its entirety.

BACKGROUND

Technical Field

The present invention relates to a saddle-ride vehicle.

Related Art

There has been conventionally known a saddle-ride vehicle including a main stand that supports a vehicle body with a rear wheel raised (see, for example, JP 2017-159824 A).

In this type of saddle-ride vehicle, an occupant raises the vehicle body, and causes a main stand to stand upright so as to support the vehicle body with the rear wheel raised.

SUMMARY

In the conventional technique, however, in a case where a saddle-ride vehicle increases in size and becomes heavier in weight, an operation of causing the main stand to stand upright may become difficult.

The present invention has been made in view of the above-described circumstances, and has an object to provide a saddle-ride vehicle that facilitates an operation of causing a main stand to stand upright.

In order to achieve the above object, in the present invention, in a saddle-ride vehicle including: a swing arm which supports a rear wheel; a cushion which is coupled between a vehicle body frame and the swing arm; and a main stand which supports a vehicle body, an eccentric cam mechanism and an actuator which drives the eccentric cam mechanism are disposed in a coupling part between the vehicle body frame and the cushion, and after the main stand is brought into a use state, the eccentric cam mechanism is driven to cause the swing arm to swing upward and to bring the rear wheel into a raised state.

According to the present invention, when the main stand is caused to stand upright and support the vehicle body, the eccentric cam mechanism is driven to cause the swing arm to swing upward and to bring the rear wheel into a raised state. Thus, an operation of causing the main stand to stand upright can be facilitated.

DETAILED DESCRIPTION

Hereinafter, embodiments of the present invention will be described with reference to the drawings. In the description, directions such as front, rear, left, right, up, and down are the same as the directions with respect to a vehicle body, unless otherwise specified. In addition, in each of the drawings, a reference sign FR denotes a front side of the vehicle body, a reference sign UP denotes an upper side of the vehicle body, and a reference sign LH denotes a left side of the vehicle body.

Embodiments

Figure 1:
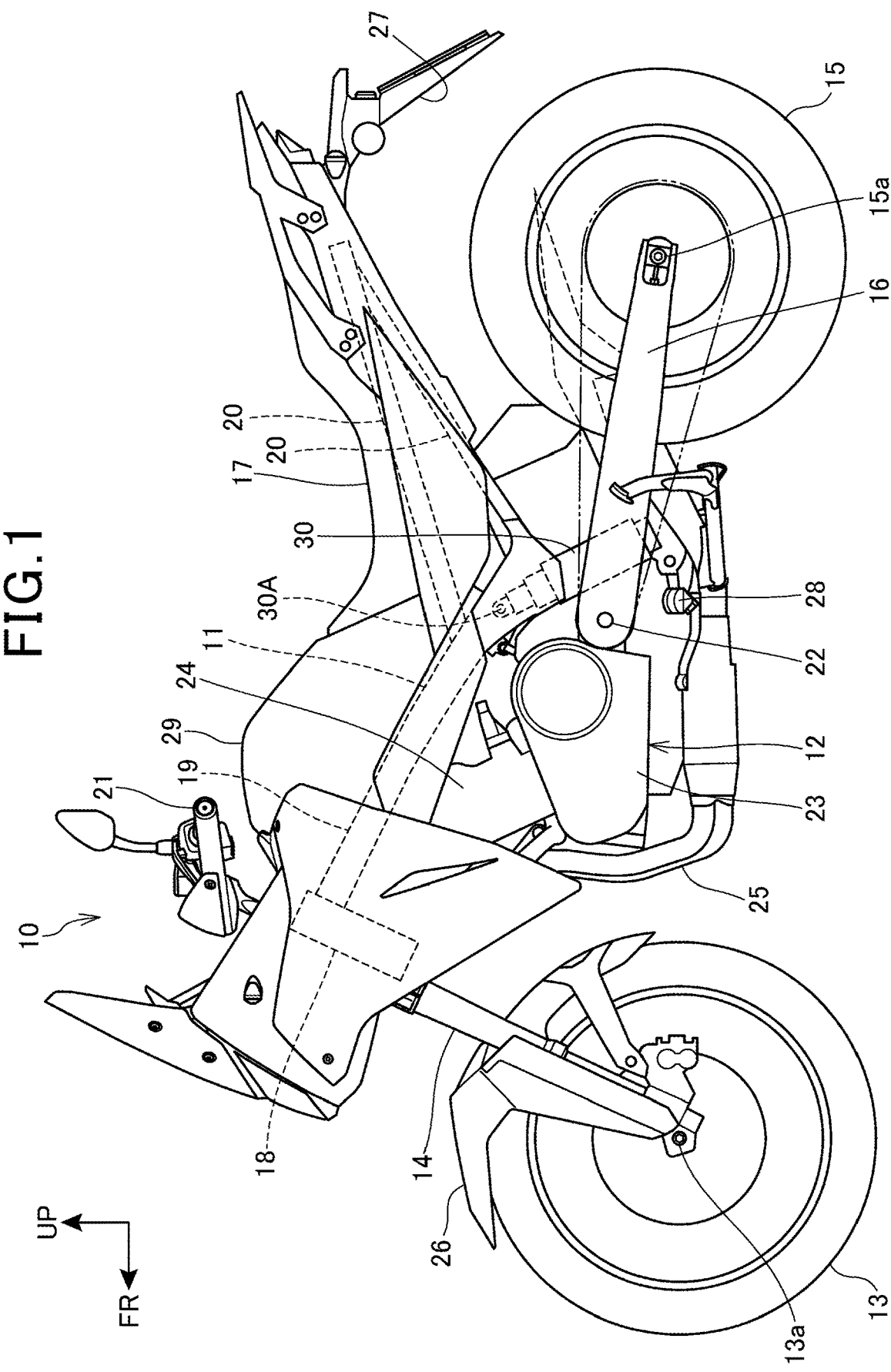
FIG. 1 is a side view of a saddle-ride vehicle according to an embodiment of the present invention.

FIG. 1 is a side view illustrating a saddle-ride vehicle 10 according to an embodiment of the present invention.

The saddle-ride vehicle 10 is a vehicle including a vehicle body frame 11, a power unit 12 to be supported by the vehicle body frame 11, a front fork 14 for steerably supporting a front wheel 13, a swing arm 16 for supporting a rear wheel 15, and a seat 17 for an occupant.

The saddle-ride vehicle 10 is a vehicle on which the occupant sits astride the seat 17. The seat 17 is provided above a rear part of the vehicle body frame 11.

The vehicle body frame 11 includes a head pipe 18 provided at a front end portion of the vehicle body frame 11, a front frame 19 positioned on a rear side of the head pipe 18, and a rear frame 20 positioned on a rear side of the front frame 19. A front end portion of the front frame 19 is connected with the head pipe 18.

The seat 17 is supported by the rear frame 20.

The front fork 14 is supported by the head pipe 18 so as to be steerable to the left and right. The front wheel 13 is supported by an axle 13a, which is provided at a lower end portion of the front fork 14. A steering handlebar 21 to be gripped by the occupant is attached to an upper end portion of the front fork 14.

The swing arm 16 is supported by a pivot shaft 22, which is further supported by the vehicle body frame 11. The pivot shaft 22 is a shaft that extends horizontally in a vehicle width direction. The pivot shaft 22 is inserted through a front end portion of the swing arm 16. The swing arm 16 swings up and down with the pivot shaft 22 as its center.

The rear wheel 15 is supported by an axle 15a, which is provided at a rear end portion of the swing arm 16.

The power unit 12 is disposed between the front wheel 13 and the rear wheel 15, and is supported by the vehicle body frame 11.

The power unit 12 is an internal combustion engine. The power unit 12 includes a crankcase 23, and a cylinder portion 24 that houses a piston that reciprocates. The cylinder portion 24 has an exhaust port, with which an exhaust device 25 is connected.

Output of the power unit 12 is transmitted to the rear wheel 15 by a driving force transmission member for connecting the power unit 12 and the rear wheel 15.

In addition, the saddle-ride vehicle 10 includes a front fender 26 for covering the front wheel 13 from above, a rear fender 27 for covering the rear wheel 15 from above, a step 28 on which the occupant places its foot, and a fuel tank 29 for storing fuel to be used by the power unit 12.

The front fender 26 is attached to the front fork 14. The rear fender 27 and the step 28 are provided below the seat 17. The fuel tank 29 is supported by the vehicle body frame 11.

A cushion 30, which is inclined rearward and downward, is disposed between the swing arm 16 and the vehicle body frame 11.

Such a cushion 30 utilizes an electronic controlled suspension system for detecting a road surface state during traveling and automatically adjusting a damper characteristic.

Figure 2:
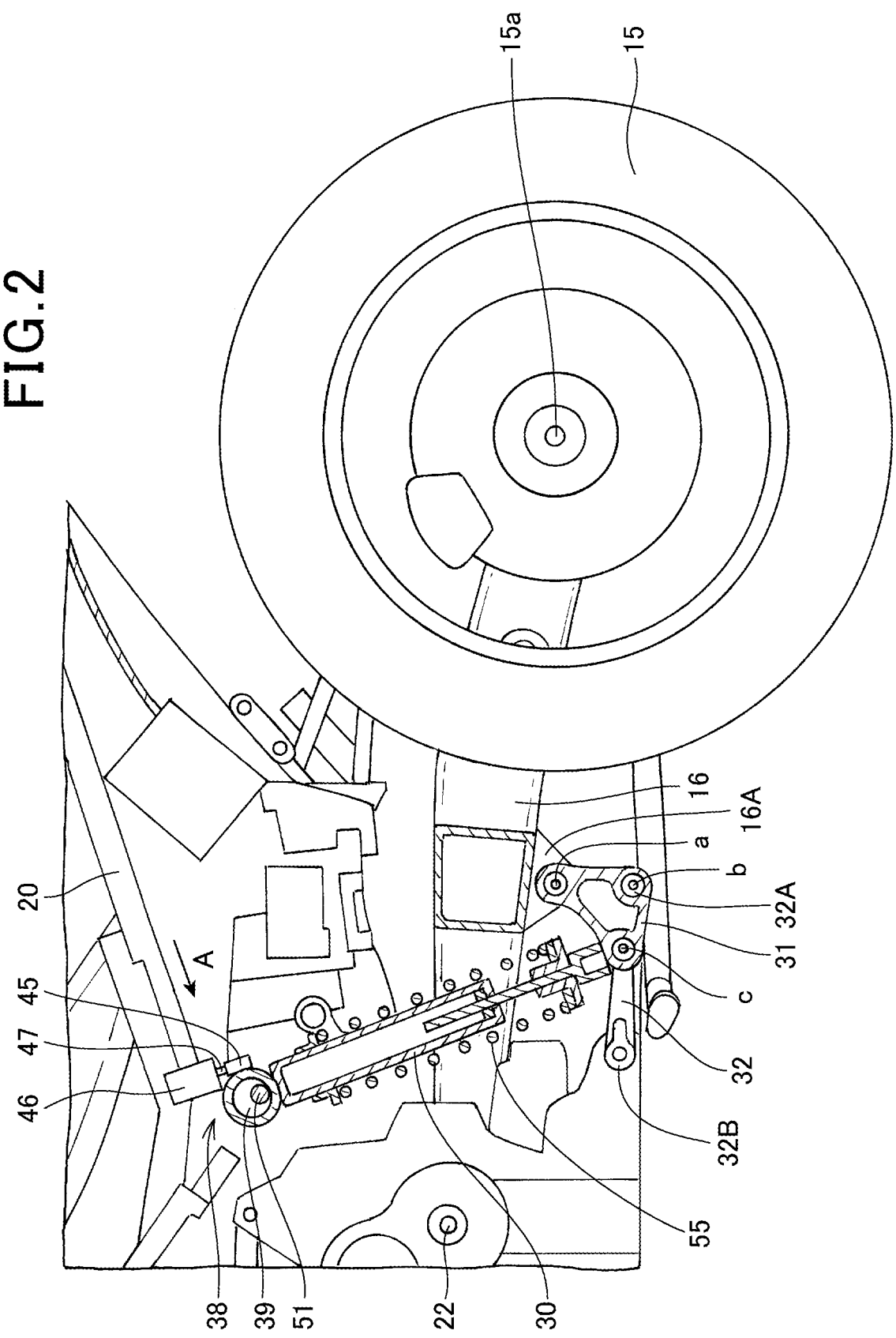
FIG. 2 is an enlarged view of a side surface in a rear part of the saddle-ride vehicle.

FIG. 2 is an enlarged view of a side surface in a rear part of the saddle-ride vehicle 10.

The saddle-ride vehicle 10 includes the cushion 30, which attenuates a vertical swing of the swing arm 16. The cushion 30 includes a coil spring 55, and the inside of the cushion 30 is filled with hydraulic oil (not illustrated).

A lower end of the cushion 30 is coupled with a link mechanism 31 having a substantially triangular shape. The link mechanism 31 includes three fulcrums a to c.

A lower end of the cushion 30 is coupled with the fulcrum c, which is positioned on a front side in the vehicle, and the fulcrum a positioned on a rear side in the vehicle is coupled with a coupling portion 16A of the swing arm 16. One end 32A of the link arm 32 is coupled with the fulcrum b positioned on a lower side, and the other end 32B of the link arm 32 is swingably supported. In addition, a lower end of the cushion 30 may be supported by any position such as the fulcrum a or b, as long as it is a position capable of supporting the swing arm 16.

When the swing arm 16 swings upward, the cushion 30 is compressed between the swing arm 16 and the vehicle body frame 11, elastic force of the coil spring 55 repels such compression force, and the impact that has been transmitted to the wheel and the vehicle body is absorbed. The coil spring 55 continues stroking by the amount corresponding to elastic energy. However, the hydraulic oil of the cushion 30 promotes the attenuation of the stroke of the coil spring 55.

A piston rod is inserted into the cushion 30, and strokes in an axial direction of the cushion 30. The piston rod includes a piston. An oil passage through which the hydraulic oil passes is formed in such a piston. A mechanism (not illustrated) for closing the oil passage of the piston may be provided so that the passing of the hydraulic oil does not occur, the piston inside the cushion does not move, or the coil spring does not expand or contract.

Figure 3:
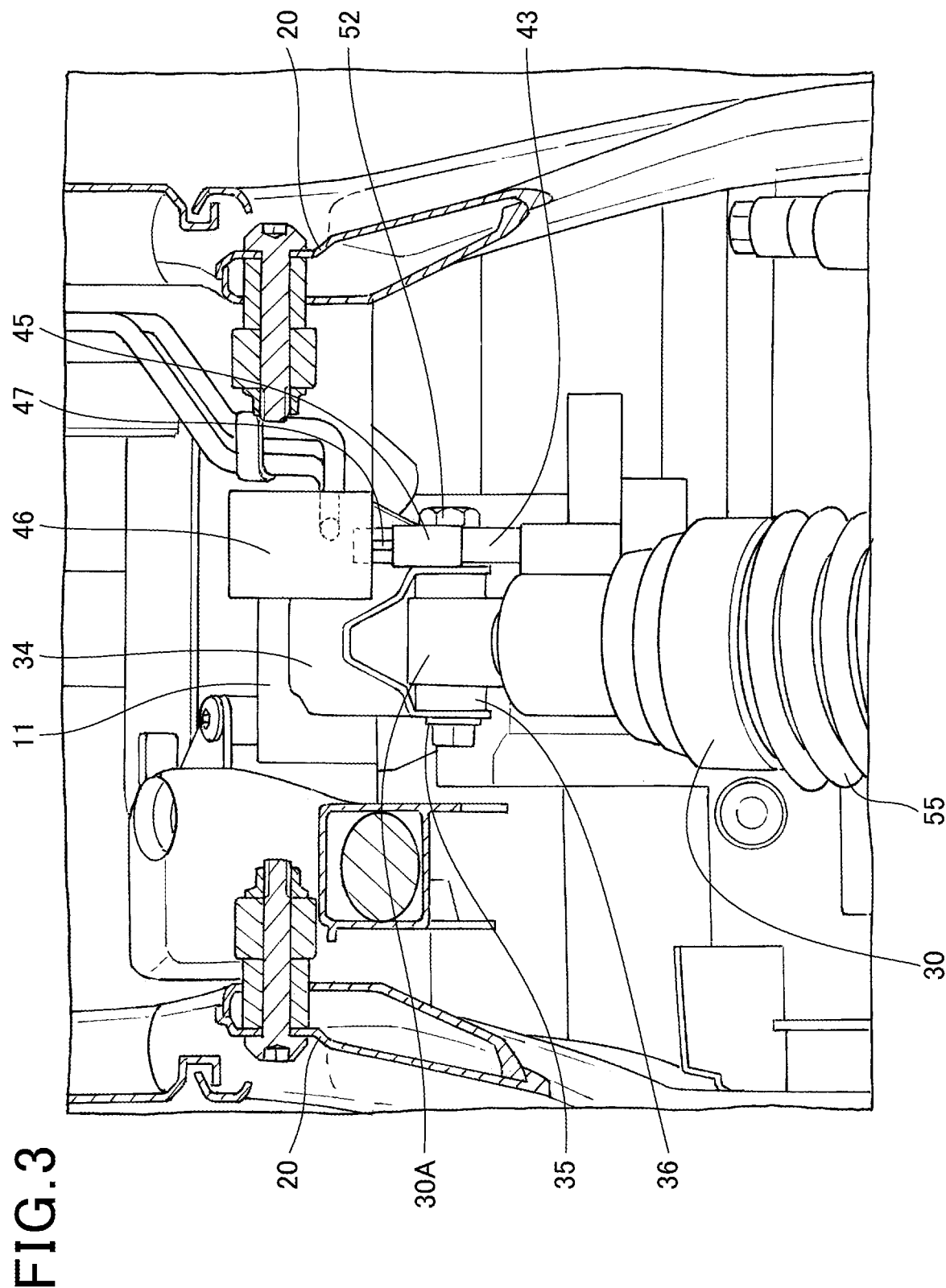
FIG. 3 is a view along an arrow A in FIG. 2.

FIG. 3 is a view along an arrow A in FIG. 2.

An upper end of the cushion 30 is coupled with the support member 34. The support member 34 is fixed to a substantially central portion in the vehicle width direction of the vehicle body frame 11. A lower portion of the support member 34 is bifurcated, and the support member 34 includes a pair of support bodies 35.

Figure 4:
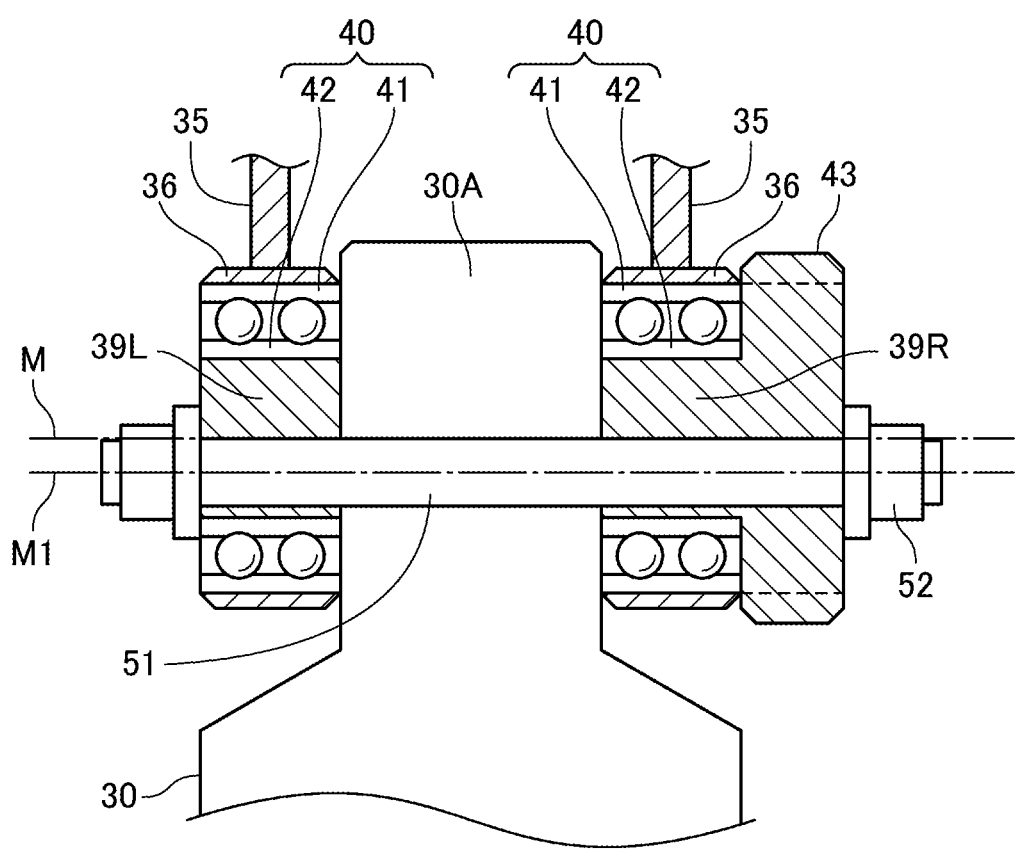
FIG. 4 is a cross-sectional view of an upper end portion of a cushion of FIG. 3.

FIG. 4 is a cross-sectional view of an upper end portion of the cushion in FIG. 3.

As illustrated in FIG. 4, the pair of support bodies 35 each includes a boss portion 36. An upper end coupling body 30A of the cushion 30 is disposed between the pair of boss portions 36.

An eccentric cam mechanism 38 is disposed on each of the pair of boss portions 36.

The eccentric cam mechanism 38 includes eccentric cams 39L and 39R, which are respectively disposed on inner circumferences of the pair of boss portions 36. Ball bearings 40 are respectively disposed between the eccentric cams 39L and 39R and the boss portions 36 of the support bodies 35. Outer rings 41 of the ball bearings 40 are respectively fit with inner circumferences of the boss portions 36, and inner rings 42 of the ball bearings 40 are respectively fit with outer circumferences of the eccentric cams 39L and 39R.

A worm wheel 43 is integrally attached to the eccentric cam 39R on the right side. As illustrated in FIG. 3, the worm wheel 43 is engaged with a worm 45. The worm 45 is attached to an output shaft 47 of a motor (actuator) 46. The motor 46 is disposed in a so-called vertical shape with an axial direction of the output shaft 47 and an axial direction of the cushion 30 coinciding with each other.

As illustrated in FIG. 4, the eccentric cams 39L and 39R, the worm wheel 43, and the upper end coupling body 30A of the cushion 30 are coupled via a coupling bolt 51, which penetrates the respective members, and a nut 52. A reference sign M denotes a center axis of the eccentric cams 39L and 39R, and a reference sign M1 denotes a center axis of the coupling bolt 51.

When the worm wheel 43 rotates, the pair of eccentric cams 39L and 39R integrally rotate about the rotation center M via the coupling bolt 51. Note that the arrangement of the motor 46 is not limited to the above vertical shape arrangement, and may be a so-called horizontal shape arrangement in which the axial direction of the output shaft 47 of the motor 46 coincides with an axial direction of the coupling bolt 51.

Figure 5:
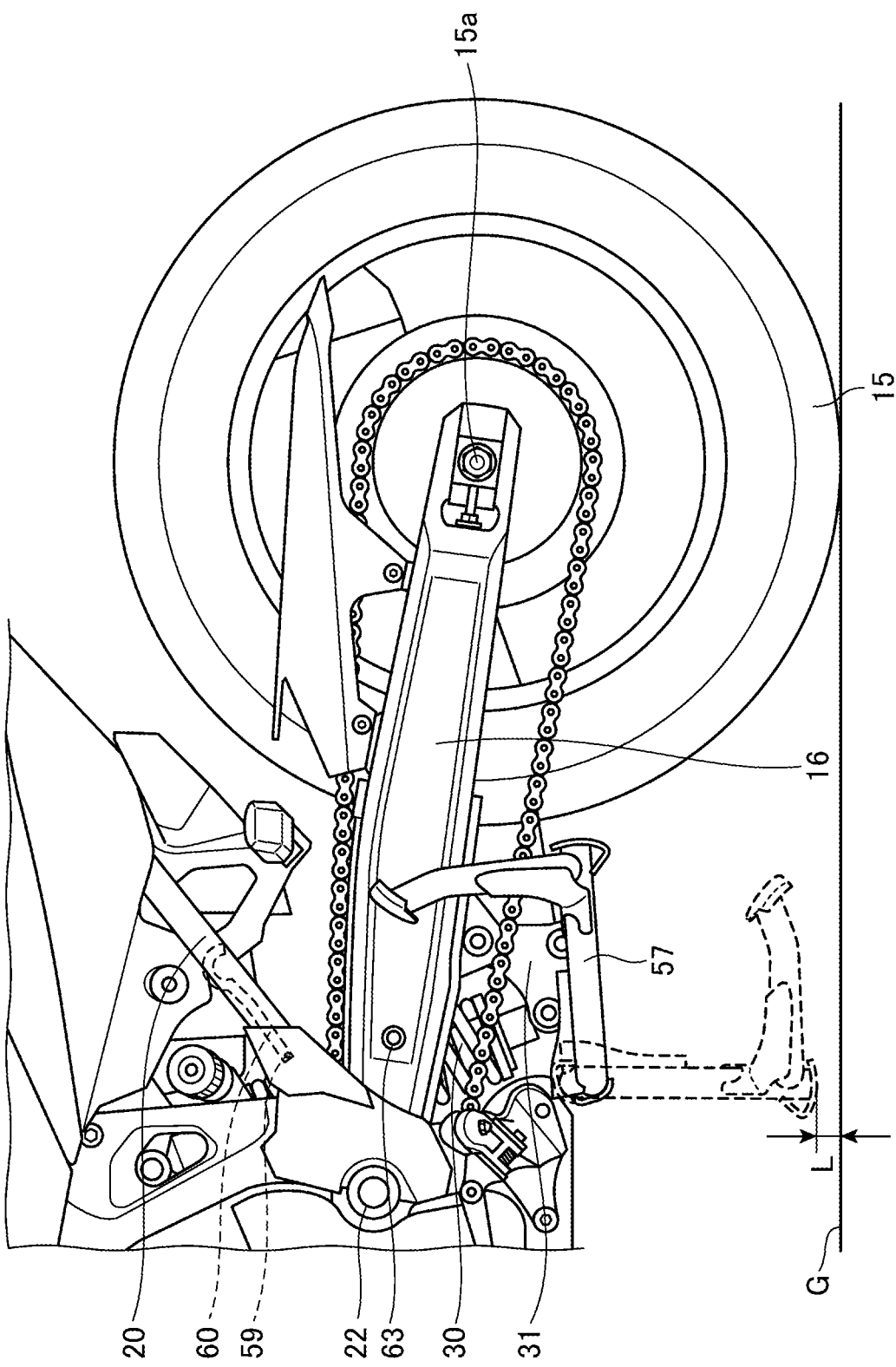
FIG. 5 is an enlarged view illustrating a main stand.

As illustrated in FIG. 5, the saddle-ride vehicle 10 includes a main stand 57. The main stand 57 includes a support shaft. The occupant kicks the main stand 57 with its foot, and rotates the main stand 57 about the support shaft to cause the main stand to stand upright.

In the present embodiment, the main stand 57 is defined as a stand for supporting the vehicle body with the rear wheel 15 raised. However, the main stand 57 is formed to have a short length. As indicated by broken lines in FIG. 5, with the main stand 57 standing upright, the rear wheel 15 is grounded on a ground G, and the rear wheel 15 is not raised off from the ground. A gap having a dimension L is generated between the main stand 57 and the ground G.

Figures 6A, 6B:
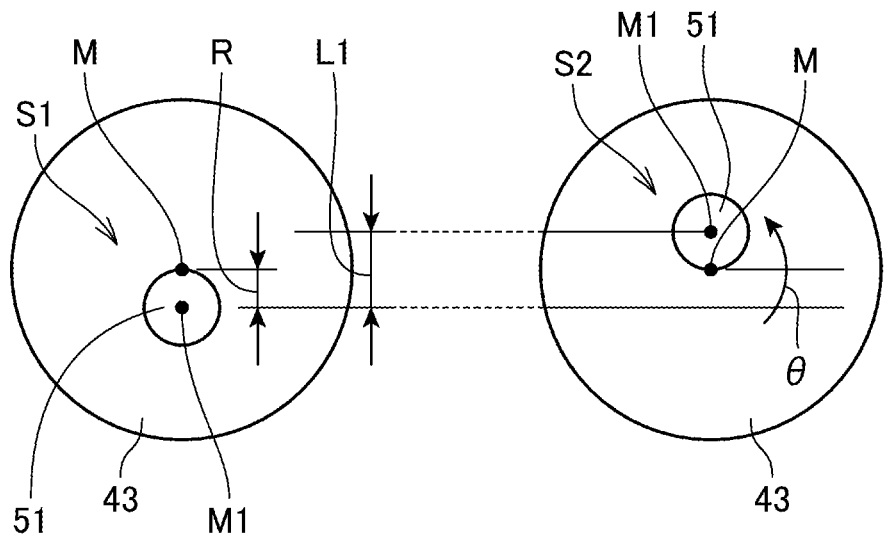
FIGS. 6A and 6B are views schematically illustrating a displacement of eccentric cams.

FIGS. 6A and 6B are views schematically illustrating a displacement of the eccentric cams, and FIGS. 6A and 6B illustrate the state of the displacement of the eccentric cams, when viewed from the worm wheel 43 side.

The coupling bolt 51 is attached so that the center axis M1 is eccentric by a distance R with respect to the rotation center M of the eccentric cams 39L and 39R.

As illustrated in FIG. 6A, the coupling bolt 51 is normally positioned in an initial position S1, which is a lowest point. When the motor 46 of the eccentric cam mechanism 38 is driven, the worm wheel 43 rotates through the worm 45. When the worm wheel 43 rotates, the pair of eccentric cams 39L and 39R rotate by a predetermined angle θ in a circumferential direction integrally with the coupling bolt 51, and as illustrated in FIG. 6B, the coupling bolt 51 is displaced from the initial position S1 to an operating position S2.

When the coupling bolt 51 is displaced from the initial position S1 to the operating position S2, the upper end coupling body 30A of the cushion 30, which is coupled between the pair of boss portions 36, rises by a dimension L1. In this embodiment, the rotation angle θ is 180 degrees, and L1=2×the distance R.

The eccentric cam mechanism 38 is driven by, for example, operating an operation element (not illustrated) disposed on the handlebar 21 with the main stand 57 standing upright. It is desirable to configure the system such that the motor 46 cannot be driven, in a case where a main stand switch (not illustrated) does not detect the main stand 57 standing upright.

Figure 7:
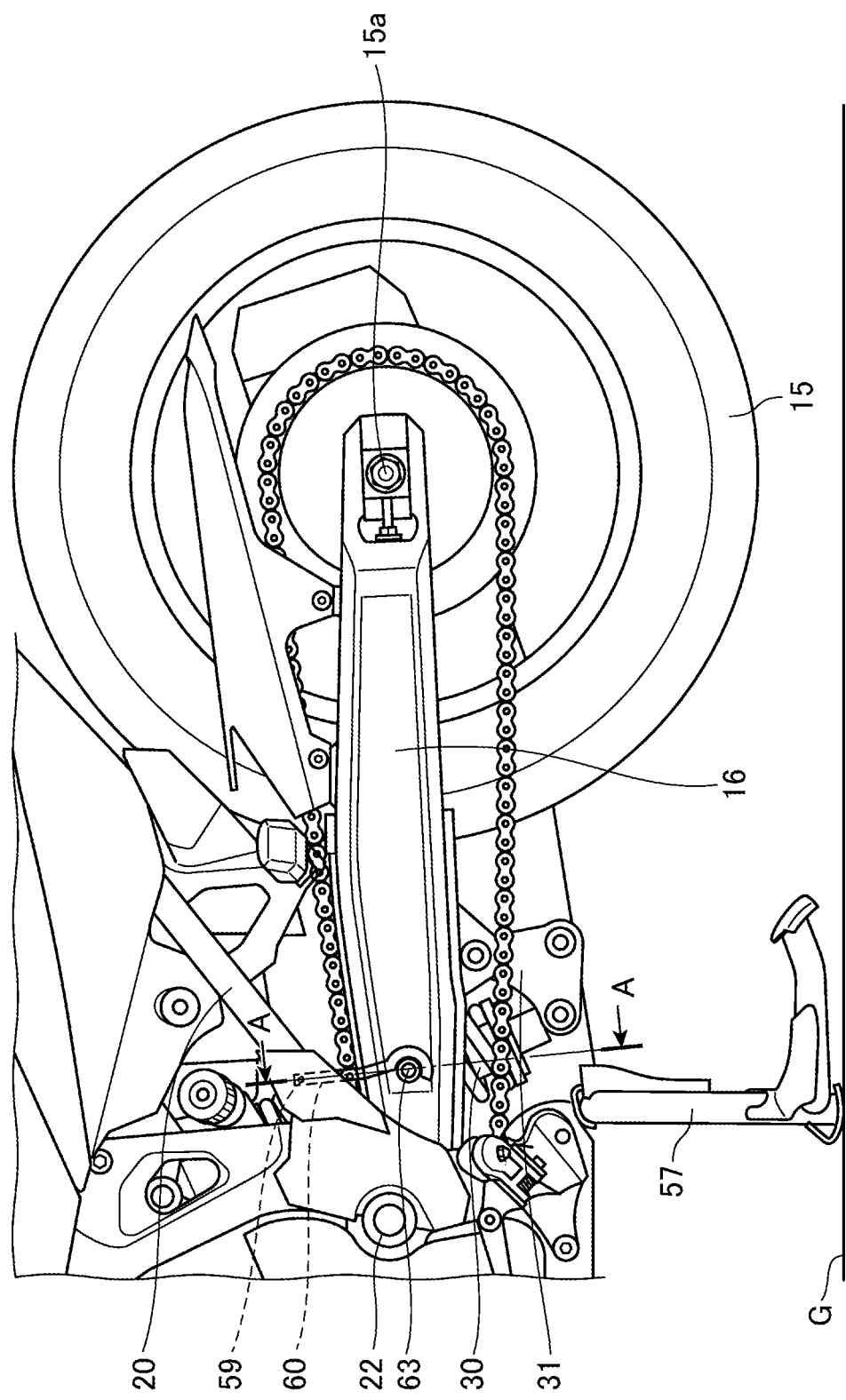
FIG. 7 is an enlarged view illustrating a rear wheel in a raised state.

As illustrated in FIGS. 6A and 6B, when the coupling bolt 51 is displaced from the initial position S1 to the operating position S2, the eccentric cam mechanism 38 is set to raise the rear wheel 15, as illustrated in FIG. 7, by much more than the dimension L, which is illustrated in FIG. 5.

When the eccentric cam mechanism 38 is driven, the mechanism (not illustrated) for closing the oil passage of the piston may be closed so that the oil in the cushion 30 does not move. This is to prevent the cushion 30 from expanding or contracting, when the eccentric cam mechanism 38 is driven.

In the present embodiment, with the main stand 57 standing upright, the rear wheel 15 is grounded as illustrated in FIG. 5. However, the eccentric cam mechanism 38 is driven with the main stand 57 standing upright. Thus, the swing arm 16 swings upward, the rear wheel 15 is raised by much more than the dimension L, which is illustrated in FIG. 5, and the rear wheel 15 is brought into a raised state as illustrated in FIG. 7.

In the present embodiment, in causing the main stand 57 to stand upright, the occupant does not have to raise the vehicle body with large force, and an operation of causing the main stand 57 to stand upright becomes easy.

In the present embodiment, the cushion 30 is capable of adjusting an initial load (preload) applied to the coil spring 55 in accordance with an occupant's weight, an occupant's riding posture, and the like. The preload amount is detected by a preload sensor (not illustrated).

In FIGS. 6A and 6B, when the motor 46 is driven, the pair of eccentric cams 39L and 39R are rotated by the predetermined angle θ in the circumferential direction. However, this angle θ may be changeable in accordance with the preload amount of the cushion 30. For example, in a case where the preload amount is large, the rotation angle of the eccentric cams 39L and 39R may be made smaller than the angle θ. By associating a preload amount to be detected with the rotation angle θ of the eccentric cams 39L and 39R, the eccentric cams 39L and 39R may be rotated by the rotation angle θ corresponding to the preload amount that has been detected.

As illustrated in FIG. 5, an engagement arm (restriction member) 60 is attached to the rear frame 20 via a pivot 59. The engagement arm 60 is urged upward by an elastic member such as a helical spring (not illustrated) disposed onto the pivot 59, and overlaps the rear frame 20 while being urged upward, in a vehicle side view.

The engagement arm 60 rotates in a vertical direction, engages with an engagement pin 63 of the swing arm 16, and restricts the swing of the swing arm 16.

The rotation direction of the engagement arm 60 may be changed as needed. In addition, the frame on which the engagement arm 60 overlaps in a side view is not limited to the rear frame 20, and may be changed to the position of an appropriate frame.

Figure 8:
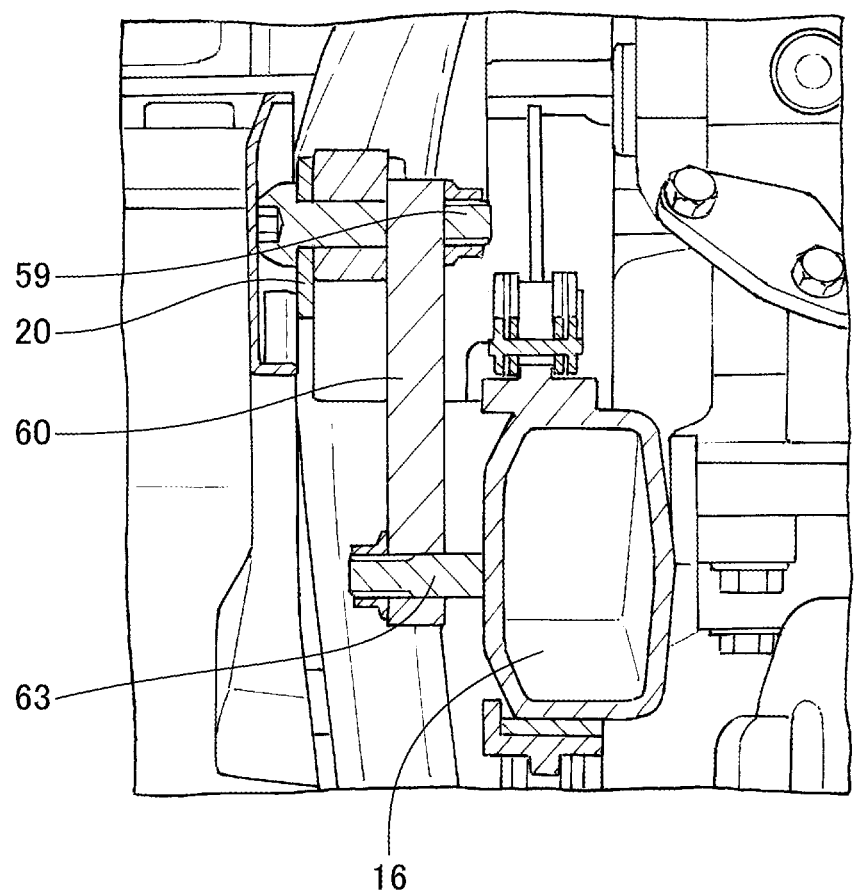
FIG. 8 is a cross-sectional view taken along line A-A of FIG. 7.
Figure 9:
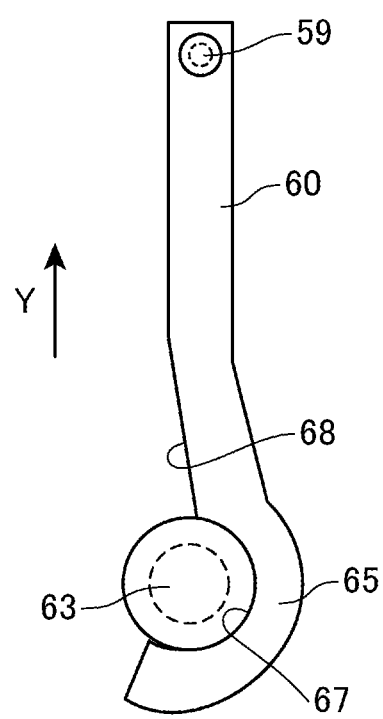
FIG. 9 is a view illustrating an engagement arm.

As illustrated in FIG. 8, the engagement pin 63 is attached to a side surface of the swing arm 16. As illustrated in FIG. 9, the engagement arm 60 includes an engagement portion 65 to engage with an engagement pin 63, which is attached to the swing arm 16.

The engagement portion 65 includes a recessed portion 67, which bends so as to cover the engagement pin 63, and an inclined portion 68, which is continuous with the recessed portion 67. In a boundary part between the recessed portion 67 and the inclined portion 68, the recessed portion 67 is formed to be shallow in depth. The inclined portion 68 is gently inclined upward from the boundary part, as a start point, between the recessed portion 67 and the inclined portion 68, when viewed in a state illustrated in FIG. 8 (a state in which the engagement arm 60 is rotated in the vertical direction).

Incidentally, when the swing arm 16 swings in a state in which the engagement arm 60 and the swing arm 16 are engaged with each other, the swing arm 16 swings in a direction indicated by an arrow Y in FIG. 9, and force for releasing the engagement between the engagement arm 60 and the swing arm 16 acts.

In the present embodiment, the recessed portion 67 is formed to be shallow in depth in the boundary part between the recessed portion 67 and the inclined portion 68, and the inclined portion 68 is inclined upward from the boundary part as the start point. Therefore, the force acting in the arrow Y direction in FIG. 9 easily releases the engagement between the engagement arm 60 and the swing arm 16, and releases the restriction of the swing of the swing arm 16.

Figure 10:
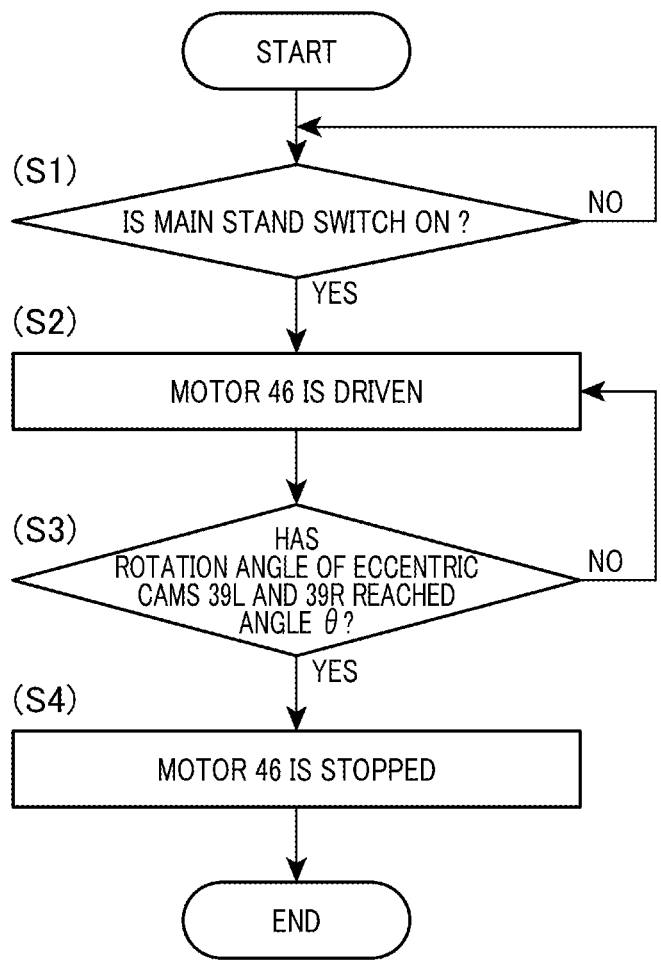
FIG. 10 is a flowchart for describing an operation of lifting up the rear wheel.

FIG. 10 is a flowchart for describing an operation of lifting up the rear wheel.

It is determined whether the main stand switch (not illustrated) is ON or OFF (step 1). In a case where it is OFF, step 1 is repeated. This is to prevent the swing arm 16 from swinging, when the main stand 57 does not stand upright.

In a case where it is ON, the motor 46 of the eccentric cam mechanism 38 is driven (step 2). Next, it is determined whether the rotation angle of the eccentric cams 39L and 39R has reached the angle θ illustrated in FIGS. 6A and 6B (step 3), and in a case where the rotation angle has not reached the angle θ, the driving of the motor 46 is continued until the rotation angle reaches the angle θ. In a case where the rotation angle of the eccentric cams 39L and 39R has reached the angle θ, the driving of the motor 46 is stopped (step 4).

In the present embodiment, in a case where the eccentric cam mechanism 38 is positioned in the initial position S1, the rear wheel 15 is grounded on the ground G even though the occupant causes the main stand 57 to stand upright. In this state, when the eccentric cam mechanism 38 is driven, the swing arm 16 swings upward, the rear wheel 15 is displaced upward, the rear wheel 15 is raised off from the ground, and the main stand 57 is grounded.

In the present embodiment, an inconvenient operation by the occupant to lift up the vehicle body every time and cause the main stand 57 to stand upright with the rear wheel 15 raised becomes no longer necessary. In particular, even though the saddle-ride vehicle 10 increases in size and becomes heavier in weight, it is possible to cause the main stand 57 to stand upright, and to support the vehicle body easily.

However, when the occupant causes the main stand 57 to stand upright, as long as human power is reduced in using the main stand 57, the main stand 57 may be slightly grounded.

Figure 11:
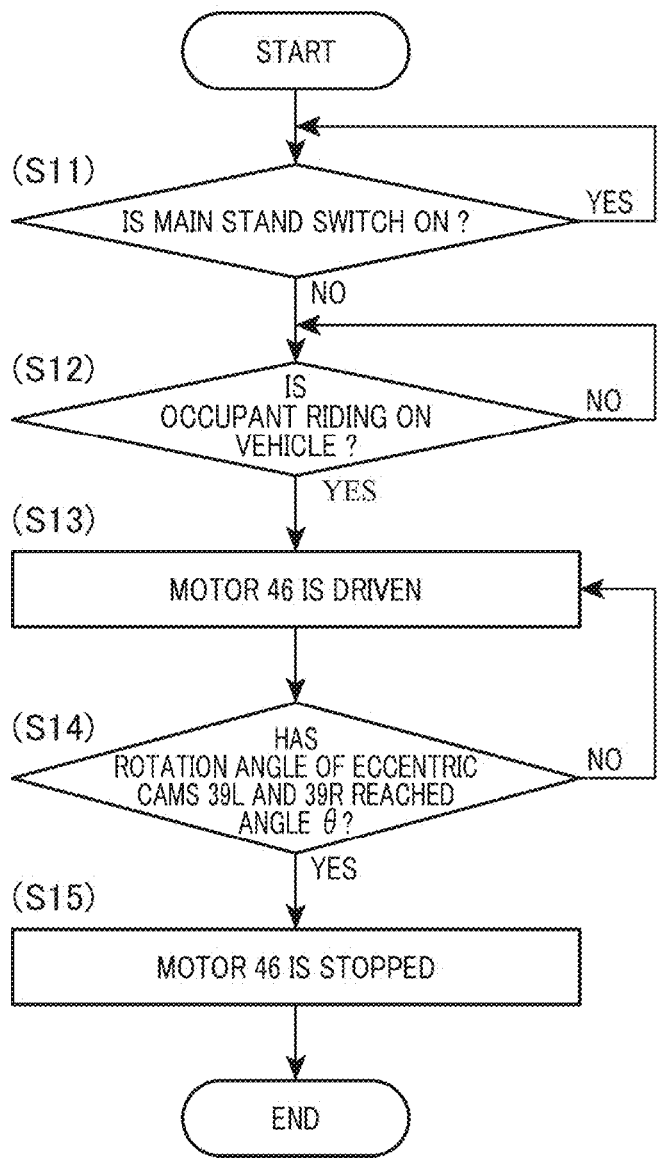
FIG. 11 is a flowchart for describing an operation of lifting down the rear wheel.

FIG. 11 is a flowchart for describing an operation of lifting down the rear wheel.

It is determined whether the main stand switch (not illustrated) is ON or OFF (step 11). In a case where it is ON, step 11 is repeated. This is to prevent the swing arm 16 from swinging, when the main stand 57 stands upright.

In a case where it is OFF, it is determined whether an occupant is riding on the vehicle (step 12). In a case where the occupant is not riding on the vehicle, step 12 is repeated. This is to prevent the swing arm 16 from swinging, when the occupant is not riding on the vehicle. In a case where it is ON, the motor 46 of the eccentric cam mechanism 38 is driven, and the motor 46 is reversely rotated (step 13). Next, it is determined whether the rotation angle of the eccentric cams 39L and 39R is reversely rotated by the angle θ illustrated in FIGS. 6A and 6B (step 14). In a case where the reverse rotation has not been completed, the driving of the motor 46 is continued until the reverse rotation is completed. In a case where the reverse rotation has been completed, the driving of the motor 46 is stopped (step 15).

In the present embodiment, in a case where the eccentric cam mechanism 38 is positioned in the operating position S2, the swing arm 16 swings upward, the vehicle body is supported by the main stand 57, and the rear wheel 15 is raised off from the ground G. In this state, when the motor 46 of the eccentric cam mechanism 38 is reversely rotated, the swing arm 16 swings downward, and the rear wheel 15 is grounded. Then, after the rear wheel 15 is grounded, the occupant kicks the main stand 57 to prepare for driving.

In the present embodiment, by simply rotating the motor 46 reversely, the rear wheel 15 is grounded. Therefore, it is possible to start the preparation for driving easily.

In the present embodiment, the rear wheel 15 is raised by the eccentric cam mechanism 38. This easily enables parking with use of the main stand 57.

The coupling bolt 51 couples the eccentric cam 39, the cushion 30, and the vehicle body frame 11. Therefore, when the eccentric cam mechanism operates, the cushion 30 is capable of moving with respect to the vehicle body frame 11.

In addition, the eccentric cam mechanism 38 includes the ball bearings 40. This enables the eccentric cams to rotate smoothly.

The cushion 30 and the swing arm 16 are coupled through the link mechanism 31. Therefore, when the cushion 30 moves while being fixed so as not to expand or contract, the swing arm is also capable of moving accordingly.

The preload sensor is capable of detecting a preload amount related to a degree of expansion or contraction of the cushion 30. Therefore, it is possible to adjust the rotation amount of the eccentric cam 39 necessary for raising the rear wheel 15.

The engagement arm (restriction member) 60 is attached to the vehicle body frame 11 via the pivot 59. The engagement arm 60 is urged upward by the elastic member such as the helical spring disposed onto the pivot 59, and overlaps the vehicle body frame 11 while being urged upward, in a vehicle side view. Therefore, while the engagement arm is not used, the appearance of the vehicle is not impaired.

The engagement arm 60 rotates in a vertical direction, engages with an engagement pin 63 of the swing arm 16, and restricts the swing of the swing arm 16. Therefore, the function of the main stand 57 can be maintained without the load of the rear wheel 15 being applied only to the cushion 30.

The inclined portion 68 is formed in the engagement portion 65 of the engagement arm 60. Therefore, when the swing arm 16 swings upward, the engagement arm 60 can be easily detached from the swing arm 16. It is possible to prevent traveling while using the engagement arm 60.

Configurations Supported by Above Embodiments

The above embodiments support the following configurations.

Configuration 1: In a saddle-ride vehicle including: a swing arm which supports a rear wheel; a cushion which is coupled between a vehicle body frame and the swing arm; and a main stand which supports a vehicle body, an eccentric cam mechanism and an actuator which drives the eccentric cam mechanism are disposed in a coupling part between the vehicle body frame and the cushion, and after the main stand is brought into a use state, the eccentric cam mechanism is driven to cause the swing arm to swing upward and to bring the rear wheel into a raised state.

According to this configuration, the eccentric cam mechanism is driven, the rear wheel can be raised, and it becomes possible to use the main stand easily.

Configuration 2: In the saddle-ride vehicle according to the configuration 1, when the eccentric cam mechanism does not cause the swing arm to swing upward, the main stand is not in contact with a road surface in the use state.

According to this configuration, the main stand is not in contact with the road surface, and it becomes possible to operate the main stand easily.

Configuration 3: The saddle-ride vehicle according to the configuration 1 or 2, in which the eccentric cam mechanism is configured such that a coupling body at an upper end of the cushion is fit between a pair of boss portions of a pair of support bodies which are fixed to the vehicle body frame, a coupling bolt is penetrated and couples the pair of boss portions and the coupling body at the upper end, and eccentric cams are respectively provided between inner circumferences of the pair of boss portions and an outer circumference of the coupling bolt.

According to this configuration, the vehicle body frame is also capable of moving in accordance with a movement of the cushion.

Configuration 4: The saddle-ride vehicle according to any one of the configurations 1 to 3, in which a driving amount for the eccentric cam mechanism is changeable in accordance with a preload amount of the cushion.

According to this configuration, it is possible to adjust the rotation amount of the eccentric cam necessary for raising the rear wheel 15.

Configuration 5: The saddle-ride vehicle according to any one of the configurations 1 to 4, in which the rear frame includes a restriction member to be engaged with the swing arm and to restrict the swing arm from swinging downward, when the swing arm is caused to swing upward.

According to this configuration, the function of the main stand can be maintained without the load of the rear wheel being applied only to the cushion.

Configuration 6: The saddle-ride vehicle according to the configuration 5, in which the restriction member is urged by an elastic member, and when an engagement between the restriction member and the swing arm is released, the restriction member is caused to swing by urging force of the elastic member, and the restriction member overlaps a frame member in a vehicle side view.

According to this configuration, while the restriction member is not used, the appearance of the vehicle is not impaired.

Configuration 7: The saddle-ride vehicle according to the configurations 5 or 6, in which the restriction member includes an engagement portion to be engaged with the swing arm, and the engagement portion includes an inclined portion which is inclined upward.

According to this configuration, when the swing arm swings upward, the restriction member can be easily detached from the swing arm, and it is possible to prevent traveling while using the restriction member.

Note that the present invention is not limited to the above-described embodiments, and can be implemented in various modes. For example, in the above embodiments, the motorcycle has been described as an example of the saddle-ride vehicle. However, the present invention is not limited to this. The present invention is applicable to a three-wheeled saddle-ride vehicle including either two front wheels or two rear wheels, and to a saddle-ride vehicle including four or more wheels.

REFERENCE SIGNS LIST

10 Saddle-ride vehicle
11 Vehicle body frame
15 Rear wheel
16 Swing arm
16A Coupling portion
19 Front frame
20 Rear frame
22 Pivot shaft
26 Front fender
27 Rear fender
28 Step
30 Cushion
30A Upper end coupling body
31 Link mechanism
32 Link arm
34 Support member
35 Support body
36 Boss portion
38 Eccentric cam mechanism
39 Eccentric cam
43 Worm wheel
45 Worm
46 Actuator
46 Motor
47 Output shaft
51 Coupling bolt
55 Coil spring
57 Main stand
60 Engagement arm
63 Engagement pin
65 Engagement portion
68 Inclined portion

What is claimed is:

1. A saddle-ride vehicle comprising: a swing arm which supports a rear wheel; a cushion which is coupled between a vehicle body frame and the swing arm; and a main stand which supports a vehicle body, wherein
an eccentric cam mechanism and an actuator which drives the eccentric cam mechanism are disposed in a coupling part between the vehicle body frame and the cushion, and
after the main stand is brought into a use state, the eccentric cam mechanism is driven to cause the swing arm to swing upward and to bring the rear wheel into a raised state.

2. The saddle-ride vehicle according to claim 1, wherein when the eccentric cam mechanism does not cause the swing arm to swing upward, the main stand is not in contact with a road surface in the use state.

3. The saddle-ride vehicle according to claim 1, wherein
the eccentric cam mechanism includes a pair of support bodies on a support member fixed to the vehicle body frame,
eccentric cams are provided on inner circumferences of each of boss portions provided in the pair of support bodies, and
a coupling bolt is penetrated and couples the eccentric cams and a coupling body at the upper end of the cushion.

4. The saddle-ride vehicle according to claim 1, wherein a driving amount for the eccentric cam mechanism is changeable in accordance with a preload amount of the cushion.

5. The saddle-ride vehicle according to claim 1, further comprising a restriction member that is attached via a pivot to a rear frame which constitutes rear of the vehicle body frame, that overlaps the rear frame by an upward urging force, rotates in a vertical direction when the swing arm swings upward, and engages with the swing arm to restrict the swing arm from swinging downward.

6. The saddle-ride vehicle according to claim 5, wherein the restriction member is urged by an elastic member, and when an engagement between the restriction member and the swing arm is released, the restriction member is caused to swing by urging force of the elastic member, and the restriction member overlaps a frame member in a vehicle side view.

7. The saddle-ride vehicle according to claim 5, wherein the restriction member includes an engagement portion to be engaged with the swing arm, and the engagement portion includes an inclined portion which is inclined upward.

8. The saddle-ride vehicle according to claim 3, wherein the eccentric cams are rotated by the actuator, and a position of the coupling body at an upper end of the cushion is changed.

9. The saddle-ride vehicle according to claim 2, wherein when the swing arm is swung upward by the eccentric cam mechanism, the main stand, in the use state, comes into contact with the road surface and the vehicle stands itself.

* * * * *